(12) United States Patent
Hannuksela

(10) Patent No.: US 7,751,473 B2
(45) Date of Patent: Jul. 6, 2010

(54) VIDEO CODING

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 847 days.

(21) Appl. No.: 10/138,178

(22) Filed: May 2, 2002

(65) Prior Publication Data

US 2003/0067637 A1    Apr. 10, 2003

Related U.S. Application Data

(63) Continuation-in-part of application No. 09/854,461, filed on May 15, 2001.

(30) Foreign Application Priority Data

May 15, 2000    (GB)    ................................ 0011606.1

(51) Int. Cl.
 *H04N 7/12* (2006.01)
(52) U.S. Cl. .............. 375/240.01; 375/240; 375/240.12
(58) Field of Classification Search .................. 375/240, 375/240.01, 240.12–240.16, 240.2, 240.24, 375/240.25, 240.27; 382/236; *H04N 7/12*
See application file for complete search history.

(56) References Cited

U.S. PATENT DOCUMENTS

| | | | |
|---|---|---|---|
| 6,188,728 B1* | 2/2001 | Hurst ..................... | 375/240.16 |
| 6,438,165 B2* | 8/2002 | Normile ..................... | 375/240 |
| 6,683,988 B1* | 1/2004 | Fukunaga et al. ...... | 375/240.27 |
| 6,700,933 B1* | 3/2004 | Wu et al. ............... | 375/240.16 |
| 2001/0040926 A1 | 11/2001 | Hannuksela et al. | |
| 2002/0009141 A1* | 1/2002 | Yamaguchi et al. .... | 375/240.12 |

OTHER PUBLICATIONS

ITU-Telecommunications Standardization Sector (Proposed Draft of modified Annex L including Copyright, normative Error Concealment, and Exact IDCT Signaling), Ninth Meeting: Red Bank, NJ Oct. 19-22, 1999, pp. 1-5.*
"Error Control and Concealment for Video Communication-A Review"; Wang et al.; Proceedings of the IEEE, vol. 86, No. 5, May 1998, pp. 1-71.
"Error Concealment in MPEG Video Streams Over ATM Networks"; Salama et al.; IEEE Journal on Selected AReas in Communications, vol. 18, No. 6, Jun. 2000, pp. 1129-1144.

* cited by examiner

*Primary Examiner*—Allen Wong
(74) *Attorney, Agent, or Firm*—Foley & Lardner LLP

(57) ABSTRACT

A method of encoding a video signal representing a sequence of pictures, which comprises receiving a current picture for encoding, forming a temporal prediction of the current picture or a part thereof from a first reference picture or a part thereof associated with the current picture, and further comprising associating a second reference picture or a part thereof with the current picture for forming a temporal prediction of the current picture or a part thereof based on a similarity measure. The similarity measure is selected from a group which includes a measure indicative of the similarity between the first reference picture or a part thereof and the second reference picture or a part thereof and a measure indicative of a similarity between the current picture or a part thereof and the second reference picture or a part thereof. A corresponding video decoding method, video encoder and video decoder are presented.

38 Claims, 7 Drawing Sheets

| PSC | TR | PTYPE | PQUANT | CBM | PSBI | TR$_B$ | DBQUANT | PEI | PSUPP | PEI | GOBs | ESTUF | EOS | PSTUF |

FIG.6

| PSC | TR | PTYPE | PQUANT | CBM | PSBI | TR$_B$ | DBQUANT | SRPN | PEI |

FIG.7

# VIDEO CODING

CROSS-REFERENCE TO RELATED APPLICATIONS

This is a continuation-in-part application of a co-pending U.S. patent application, Ser. No. 09/854,461, entitled "Video Coding", filed May 15, 2001, from which priority is claimed under 35 U.S.C. 120, which is hereby incorporated by reference in its entirety. U.S. patent application Ser. No. 09/854, 461 was published Nov. 15, 2001 (Publication No. US2001/0040700 A1), claiming foreign application priority under 35 U.S.C. 119, from GB 011606.1, filed May 15, 2000.

FIELD OF THE INVENTION

This invention relates to video coding. More specifically, the invention relates to a primary or default reference picture or picture region for the frame cannot be decoded.

BACKGROUND OF THE INVENTION

A video sequence consists of a series of still pictures or frames. Video compression methods are based on reducing the redundant and perceptually irrelevant parts of video sequences. The redundancy in video sequences can be categorised into spectral, spatial and temporal redundancy. Spectral redundancy refers to the similarity between the different colour components of the same picture. Spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. In practice this is achieved by generating motion compensation data that describes the motion between the current picture and the previous picture.

However, sufficient compression cannot usually be achieved by only reducing the inherent redundancy of the sequence. Thus, video encoders also try to reduce the quality of those parts of the video sequence which are subjectively less important. In addition, the redundancy of the encoded bit-stream is reduced by means of efficient lossless coding of compression parameters and coefficients. The main technique is to use variable length codes.

Video compression methods typically differentiate between pictures that utilise temporal redundancy reduction and those that do not. Compressed pictures that do not utilise temporal redundancy reduction methods are usually called INTRA or I-frames or I-pictures. Temporally predicted images are usually forwardly predicted from a picture occurring before the current picture and are called INTER or P-frames. In the case of INTER frames, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B-frames. B-pictures are inserted between anchor picture pairs of I- and/or P-frames and are predicted from either one or both of these anchor pictures. B-pictures normally yield increased compression compared with forward-predicted pictures. B-pictures are not used as anchor pictures, i.e., other pictures are not predicted from them. Therefore they can be discarded (intentionally or unintentionally) without impacting the picture quality of future pictures. Whilst B-pictures may improve compression performance compared with P-pictures, their generation requires greater computational complexity and memory usage, and they introduce additional delays. This may not be a problem for non-real time applications such as video streaming but may cause problems in real-time applications such as video-conferencing.

A compressed video clip typically consists of a sequence of pictures, which can be roughly categorised into temporally independent INTRA pictures and temporally differentially coded INTER pictures. Since the compression efficiency in INTRA pictures is normally lower than in INTER pictures, INTRA pictures are used sparingly, especially in low bit-rate applications.

A video sequence may consist of a number of scenes or shots. The picture contents may be remarkably different from one scene to another, and therefore the first picture of a scene is typically INTRA-coded. There are frequent scene changes in television and film material, whereas scene cuts are relatively rare in video conferencing. In addition, INTRA pictures are typically inserted to stop temporal propagation of transmission errors in a reconstructed video signal and to provide random access points to a video bit-stream.

Compressed video is easily corrupted by transmission errors, mainly for two reasons. Firstly, due to utilisation of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames, so temporal error propagation is not stopped for some time. Secondly, the use of variable length codes increases the susceptibility to errors. When a bit error alters the codeword, the decoder will lose codeword synchronisation and also decode subsequent error-free codewords (comprising several bits) incorrectly until the next synchronisation (or start) code. A synchronisation code is a bit pattern which cannot be generated from any legal combination of other codewords and such codes are added to the bit stream at intervals to enable re-synchronisation. In addition, errors occur when data is lost during transmission. For example, in video applications using the unreliable UDP transport protocol in IP networks, network elements may discard parts of the encoded video bit-stream.

There are many ways for the receiver to address the corruption introduced in the transmission path. In general, on receipt of a signal, transmission errors are first detected and then corrected or concealed by the receiver. Error correction refers to the process of recovering the erroneous data perfectly as if no errors had been introduced in the first place. Error concealment refers to the process of concealing the effects of transmission errors so that they are hardly visible in the reconstructed video sequence. Typically some amount of redundancy is added by the source or transport coding in order to help error detection, correction and concealment.

There are numerous known concealment algorithms, a review of which is given by Y. Wang and Q.-F. Zhu in "Error Control and Concealment for Video Communication: A Review", Proceedings of the IEEE, Vol. 86, No. 5, May 1998, pp. 974-997. and an article by P. Salama, N. B. Shroff, and E. J. Delp, entitled "Error Concealment in MPEG Video Streams over ATM Networks", IEEE Journal on Selected Areas in Communications, Vol. 18, No. 6, June 2000.

Current video coding standards define a syntax for a self-sufficient video bit-stream. The most popular standards at the time of writing are International Telecommunications Union ITU-T Recommendation H.263, "Video coding for low bit rate communication", February 1998; International Standards Organisation/International Electro-technical Commission ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a hierarchy for bit-streams and correspondingly for image sequences and images. Development of further video coding standards is still ongoing. In particular, standardisation efforts in the development of a long-term successor for H.263, known as H.26L and further developments of MPEG video coding are now being conducted jointly under the auspices of a standardisation body known as the Joint Video Team (JVT) of ISO/IEC MPEG (Motion Pictures Expert Group) and ITU-T VCEG (Video Coding Experts Group).

By default, these standards use the temporally previous anchor (I, EI, P, or EP) picture as a reference for temporal prediction. Generally, this information is not transmitted, i.e. the bit-stream does not contain information relating to the identity of the reference picture. Consequently, a decoder that receives an encoded video bit-stream has no means of detecting whether a reference picture has been lost. Many transport coders packetise video data in such a way that they associate a sequence number with the each of the data packets they produce. However, this kind of sequence number is not related to the video bit-stream. For example, a section of a video bit-stream may contain the data for P-picture P1, B-picture B2, P-picture P3, and P-picture P4 captured (and to be displayed) in this order. However, this section of the video bitstream would be compressed, transmitted, and decoded in the following order: P1, P3, B2, P4, since B2 requires both P1 and P3 before it can be encoded or decoded. If the transport coder packetises each picture into a single packet having a sequence number and the packet carrying B2 is lost, the receiver can detect loss of the data packet from the packet sequence numbers. However, the receiver has no means to detect if it has lost a motion compensation reference picture for P4 or if it has lost a B-picture, in which case it could continue decoding normally.

The decoder therefore usually sends an INTRA request to the transmitter and freezes the picture on the display. However the transmitter may not be able to respond to this request. For instance in a non-real-time video streaming application, the transmitter cannot respond to an INTRA request from a decoder. Therefore the decoder freezes the picture until the next INTRA frame is received. In a real-time application such as video-conferencing, the transmitter may not be able to respond at all. For instance, in a multi-party conference, the encoder may not be able to respond to individual requests. Again the decoder freezes the picture until an INTRA frame is output by the transmitter.

SUMMARY OF THE INVENTION

According to a first aspect of the invention there is provided a method of encoding a video signal representing a sequence of pictures, the method comprising receiving a current picture for encoding, forming a temporal prediction of the current picture or a part thereof from a first reference picture or a part thereof associated with the current picture, the method further comprising associating a second reference picture or a part thereof with the current picture for forming a temporal prediction of the current picture or a part thereof based on a similarity measure, said similarity measure being selected from a group including: a similarity measure indicative of the similarity between the first reference picture or a part thereof and said second reference picture or a part thereof and a similarity measure indicative of a similarity between the current picture or a part thereof and said second reference picture or a part thereof.

The measure of similarity may be defined for portions of a picture, e.g. for blocks or other non-rectangular areas of the pictures.

Preferably, the method includes outputting an indicator identifying the second reference picture or part thereof. A video encoder can use this indicator to inform a corresponding decoder about one or more pictures or parts of pictures that resemble the current motion compensation reference picture so well that one of them can be used as a spare reference picture or region if the actual reference picture is lost during transmission. If a decoder can access such a spare reference picture, preferably the decoder should not send a request for an INTRA picture update. The indicator may be termed a spare reference picture number since the indicator indicates to a decoder which reference picture(s) or part(s) thereof resemble the first reference picture. This "spare" reference picture may be used by a decoder to decode the current frame if the first reference picture is lost for some reason.

As previously mentioned, the spare reference picture number may be in respect of the whole picture or part of a picture.

In a preferred implementation of the invention, the video signal is encoded according to the H.26L video coding recommendation currently under development by the Joint Video Team (JVT) of ISO/IEC MPEG (Motion Pictures Expert Group) and ITU-T VCEG (Video Coding Experts Group). In this case, the indicator is included in the Supplemental Enhancement Information.

Preferably a plurality of reference pictures or parts thereof are associated with the current picture according to their respective similarity measures. Advantageously the plurality of reference pictures or parts thereof are ranked in order of similarity the reference picture or part thereof having the closest similarity with the first reference picture or, alternatively the closest similarity with current frame, being placed first in the ranking order.

According to a second aspect of the invention there is provided a method of encoding a video signal representing a sequence of pictures, the method comprising receiving a current picture for encoding, forming a temporal prediction of the current picture or a part thereof from a first reference picture or a part thereof associated with the current picture and a second reference picture or a part thereof associated with the current picture, said first reference picture occurring temporally before the current picture and said second reference picture occurring temporally after the current picture, the method further comprising associating a third reference picture or a part thereof with the current picture for forming a temporal prediction of the current picture or a part thereof based on a similarity measure, said similarity measure being selected from a group including: a similarity measure indicative of the similarity between the first reference picture or a part thereof and said third reference picture or a part thereof; a similarity measure indicative of the similarity between the second reference picture or a part thereof and said third reference picture or a part thereof; and a similarity measure indicative of a similarity between the current picture or a part thereof and said third reference picture or a part thereof.

According to a third aspect of the invention there is provided a method of decoding an encoded video signal representing a sequence of pictures, the encoded signal including pictures that have been encoded by forming a temporal prediction of a current picture or a part thereof from a first reference picture or a part thereof associated with the current picture, the method comprising receiving an encoded video signal representing a current picture wherein, when the decoder is unable to decode the first reference picture associated with the current picture, examining an indicator identifying a second reference picture or a part thereof and decoding the current picture or a part thereof with reference to said second reference picture or part thereof if such an indicator is associated with the current picture.

According to a fourth aspect of the invention there is provided a video encoder comprising an input for receiving a video signal representing a sequence of pictures, an input for receiving a current picture for encoding, a predictive coder for forming a temporal prediction of the current picture or a part thereof from a first reference picture or a part thereof associated with the current picture and means for associating a second reference picture or a part thereof with the current picture for forming a temporal prediction of the current picture or a part thereof based on a similarity measure, said similarity measure being selected from a group including: a similarity measure indicative of the similarity between the first reference picture or a part thereof and said second reference picture or a part thereof and a similarity measure indicative of a similarity between the current picture or a part thereof and said second reference picture or a part thereof.

According to a fifth aspect of the invention there is provided a video decoder comprising an input for receiving an encoded video signal representing a sequence of pictures, the encoded signal including pictures that have been encoded by forming a temporal prediction of a current picture or a part thereof from a first reference picture or a part thereof associated with the current picture, the decoder comprising an input for receiving an encoded video signal representing a current picture and a processor for decoding the current picture wherein, when the decoder is unable to decode the first reference picture associated with the current picture, the decoder is arranged to examine an indicator identifying a second reference picture or a part thereof and to decode the current picture or a part thereof with reference to said second reference picture or part thereof if such an indicator is associated with the current picture.

According to a sixth aspect of the present invention, there is provided a method of encoding a video signal representing a sequence of pictures including a first picture and a plurality of further pictures, said further pictures including at least a second picture and a third picture, the method comprising the steps of:

forming a temporal prediction of at least a portion of the first picture using a corresponding portion of the second picture so as to allow a decoder to reconstruct the first picture based on the temporal prediction and the second picture; and obtaining a similarity measure indicative of a similarity between at least a portion of the third picture and a corresponding portion of the second picture, wherein when the similarity measure meets a predetermined criterion, said method further comprising the step of:

providing an indicator identifying the third picture so as to allow the decoder to reconstruct the first picture using the third picture as an alternative, said method characterized in that the indicator additionally identifies the portion of the third picture from which the similarity measure is obtained.

Alternatively, the similarity measure is indicative of the similarity between at least a portion of the third picture and a corresponding portion of the first picture, instead of the similarity between the portion of the third picture and the corresponding part of the second picture.

The invention also relates to a radio telecommunications device including an encoder and/or a decoder as described.

BRIEF DESCRIPTION OF THE DRAWINGS

The invention will now be described, by way of example only, with reference to the accompanying drawings, in which:

FIG. 4 illustrates the operation of a first embodiment of a video encoder according to the invention;

FIG. 5 illustrates the operation of a second implementation of a video encoder according to the invention;

FIG. 6 shows the syntax of a bit stream as known according to H.263;

FIG. 7 shows a first example of a bit stream output by an encoder according to the invention;

DETAILED DESCRIPTION OF THE INVENTION

Figure 1:
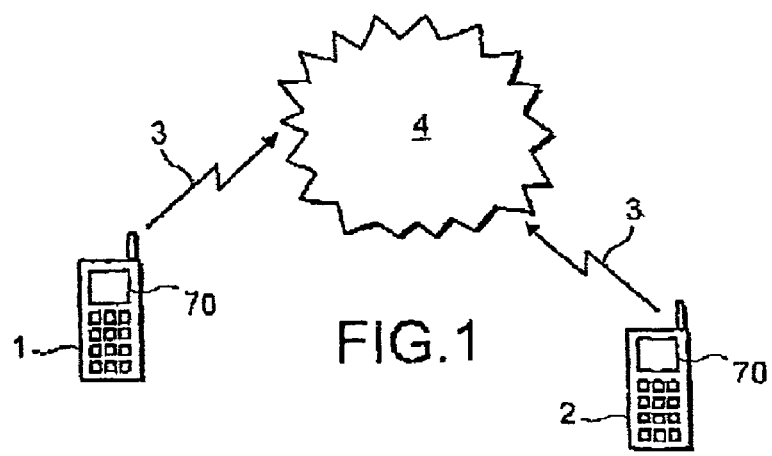
FIG. 1 shows a multimedia mobile communications system.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1, 2 as well as the multimedia data.

Figure 2:
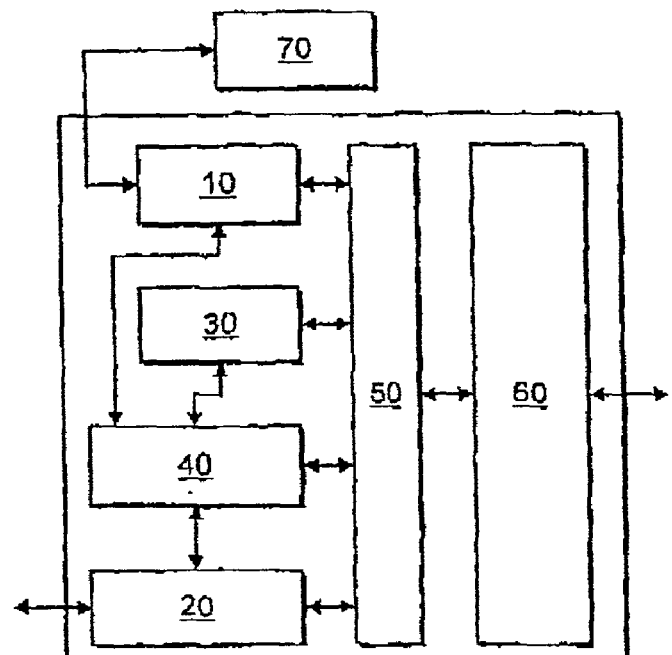
FIG. 2 shows an example of the multimedia components of a multimedia terminal.

FIG. 2 shows the typical multimedia components of a terminal 1. The terminal comprises a video codec 10, an audio codec 20, a data protocol manager 30, a control manager 40, a multiplexer/demultiplexer 50 and a modem 60 (if the required). The video codec 10 receives signals for coding from a video capture device of the terminal (not shown) (e.g. a camera) and receives signals for decoding from a remote terminal 2 for display by the terminal 1 on a display 70. The audio codec 20 receives signals for coding from the microphone (not shown) of the terminal 1 and receives signals for decoding from a remote terminal 2 for reproduction by a loudspeaker (not shown) of the terminal 1. The terminal may be a portable radio communications device, such as a radio telephone.

The control manager 40 controls the operation of the video codec 10, the audio codec 20 and the data protocols manager 30. However, since the invention is concerned with the operation of the video codec 10, no further discussion of the audio codec 20 and data protocols manager 30 will be provided.

Figure 3:
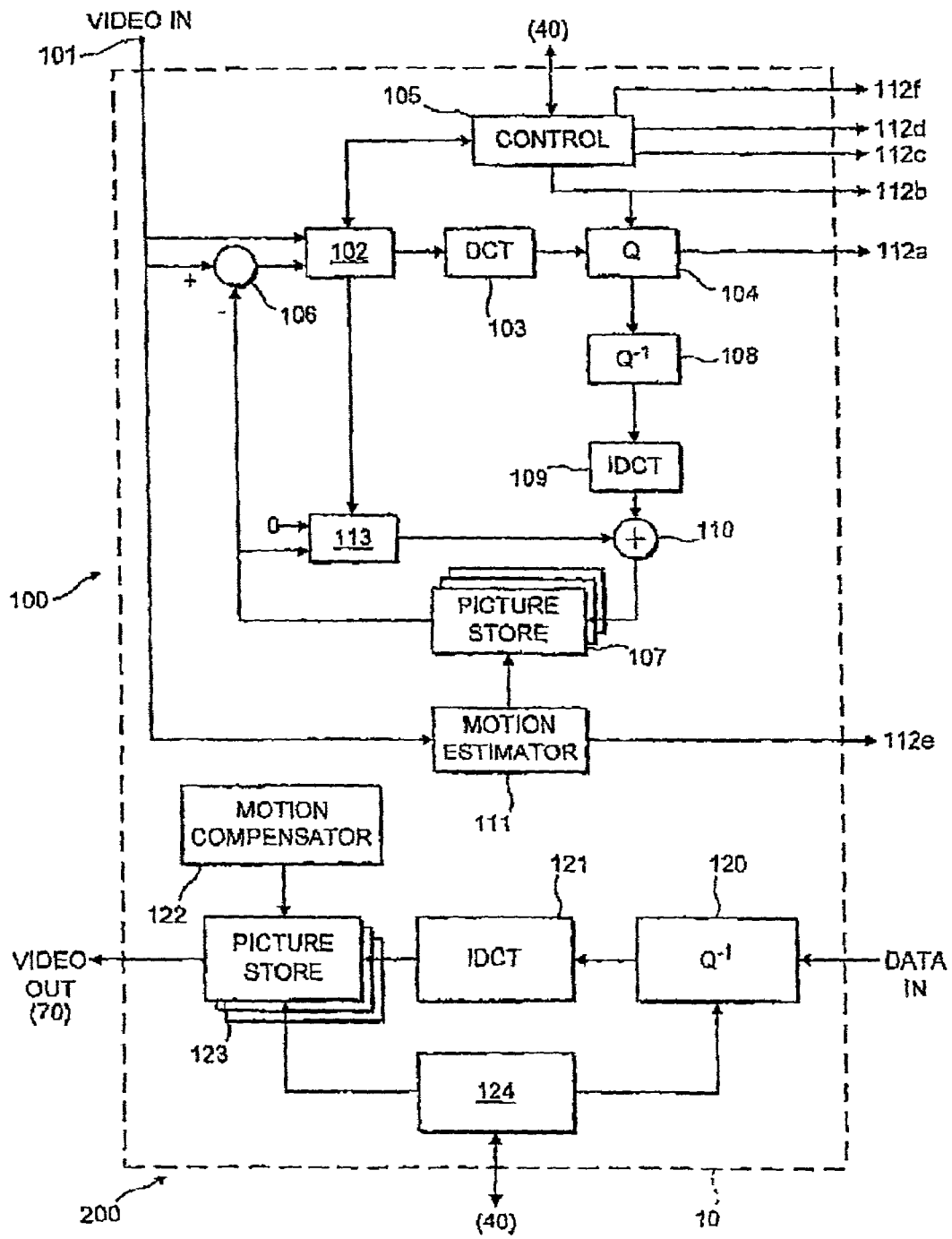
FIG. 3 shows an example of a video codec.

FIG. 3 shows an example of a video codec 10 according to the invention.

The video codec comprises an encoder part 100 and a decoder part 200. The encoder part 100 comprises an input 101 for receiving a video signal from a camera or video source (not shown) of the terminal 1. A switch 102 switches the encoder between an INTRA-mode of coding and an INTER-mode. The encoder part 100 of the video codec 10 comprises a DCT transformer 103, a quantiser 104, an inverse quantiser 108, an inverse DCT transformer 109, an adder 110, a plurality of picture stores 107 (see FIG. 3*a* for more detail), a subtractor 106 for forming a prediction error, a switch 113 and an encoding control manager 105.

The decoder part 200 of the video codec 10 comprises an inverse quantiser 120, an inverse DCT transformer 121, a motion compensator 122, a plurality of picture stores 123 and a controller 124. The controller 124 receives video codec control signals demultiplexed from the encoded multimedia stream by the demultiplexer 50. In practice the controller 105 of the encoder and the controller 124 of the decoder may be the same processor.

The operation of an encoder according to the invention, will now be described.

Referring to FIG. 3, the video codec 10 receives a video signal to be encoded. The encoder 100 of the video codec encodes the video signal by performing DCT transformation, quantisation and motion compensation. The encoded video data is then output to the multiplexer 50. The multiplexer 50 multiplexes the video data from the video codec 10 and control data from the control manager 40 (as well as other signals as appropriate) into a multimedia signal. The terminal 1 outputs this multimedia signal to the receiving terminal 2 via the modem 60 (if required).

In INTRA-mode, the video signal from the input 101 is transformed to DCT co-efficients by a DCT transformer 103. The DCT coefficients are then passed to the quantiser 104, which quantises the coefficients. Both the switch 102 and the quantiser 104 are controlled by the encoding control manager 105 of the video codec, which may also receive feedback control from the receiving terminal 2 by means of the control manager 40. A locally decoded picture is then formed by passing the data output by the quantiser 104 through the inverse quantiser 108 and applying an inverse DCT transform 109 to the inverse-quantised data. The resulting data is then input to the adder 110. In INTRA mode, switch 113 is operated so that the input to the adder 110 from the switch is set to zero. The two inputs to the adder 110 are added together and the resulting data input to the picture store 107.

In INTER mode, the switch 102 is operated to accept the difference between the signal from the input 101 and a reference picture which is stored in a picture store 107 from subtractor 106. The difference data output from the subtractor 106 represents the prediction error between the current picture and the reference picture stored in the picture store 107. A motion estimator 111 may generate motion compensation data with reference to the data in the picture store 107 in a conventional manner.

The encoding control manager 105 decides whether to apply INTRA or INTER coding or whether to code the frame at all on the basis of either the output of the subtractor 106 or in response to feedback control data from a receiving decoder. The encoding control manager may decide not to code a received frame at all when the similarity between the current frame and the reference frame is high or there is not time to code the frame. The encoding control manager operates the switch 102 accordingly.

When not responding to feedback control data, the encoder typically encodes a frame as an INTRA-frame either only at the start of coding (all other frames being P- or B-frames), or at regular periods e.g. every 5 s, or when the output of the subtractor exceeds a threshold i.e. when the current picture and that stored in the picture store 107 are judged to be too dissimilar for efficient coding in INTER format. The encoder may also be programmed to encode frames in a particular regular sequence e.g. I B B P B B P B B P B B P B B I B B P etc.

The video encoder outputs the quantised DCT coefficients 112*a*, the quantising index 112*b* (i.e. the details of the quantising used), an INTRA/INTER flag 112*c* to indicate the mode of coding performed (I or P/B), a transmit flag 112*d* to indicate the number of the frame being coded and (in INTER mode) motion vectors 112*e* for the picture being coded. These are multiplexed together with other multimedia signals by the multiplexer 50.

Figure 3A:
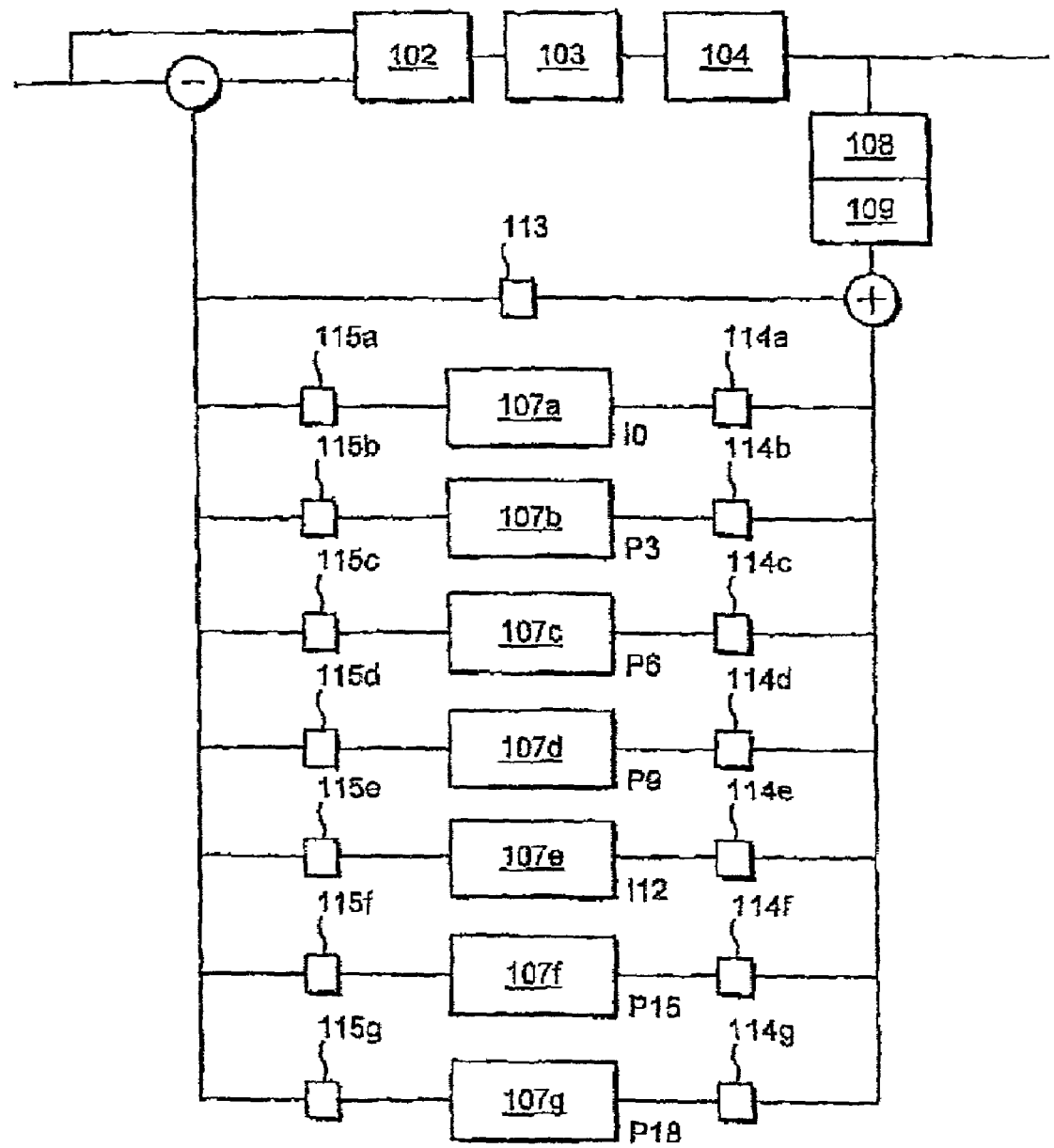
FIG. 3a shows a more detailed view of a video encoder according to the invention.

The encoder 100 will be described further with reference to FIG. 3*a*, which shows a simplified view of the encoder 100 of the video codec. The encoder 100 comprises a plurality of picture stores 107*a*-107*g*. Although in this example seven picture stores are shown, the number of picture stores may be two or more.

Figures 4, 5:
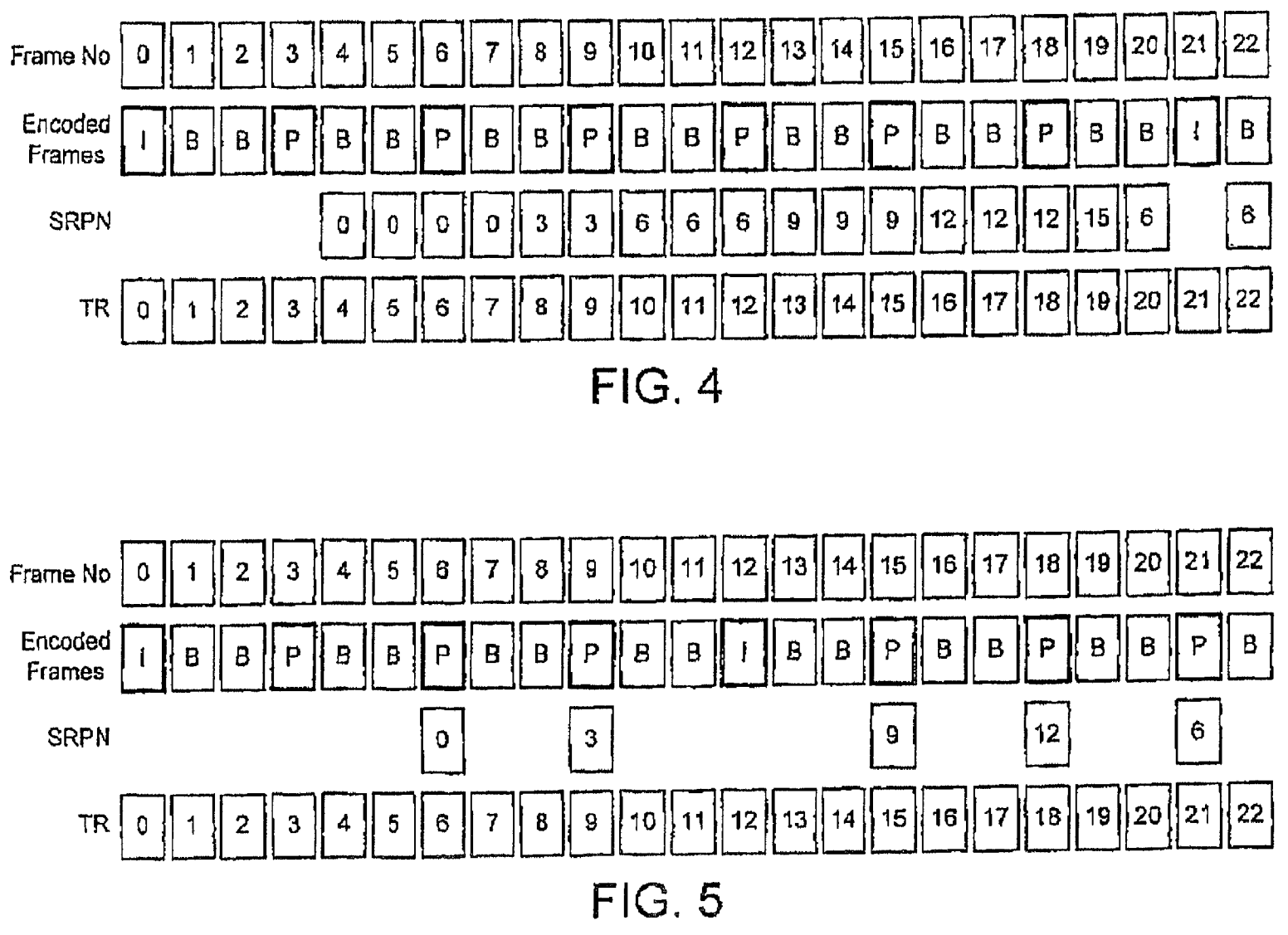

Consider an encoder that is arranged to encode an input signal with the format I B B P B B P B B P B B P B B P B B P B B I etc. For simplicity it will be assumed that the encoder encodes every frame of the input signal i.e. no frames are skipped. The encoding process is illustrated in FIG. 4.

As mentioned earlier, the frames of the video sequence to be coded are received from a video capture device in the order 0, 1, 2, 3, 4, 5, 6 etc. and are displayed in this order i.e. the decoded frames are displayed in the order I0, B1, B2, P3, B4, B5, P6 etc. However the video bit stream is compressed, transmitted and decoded in the following order I0, P3, B1, B2, P6, B4, B5 etc. This is because each B-frame requires preceding and succeeding reference frames before it can be encoded or decoded i.e. frame B1 requires frame I0 and P3 to be encoded or decoded before it can be encoded or decoded.

When the first frame is received, all of the picture stores 107 are empty and switch 102 is placed into INTRA coding mode under control of the encoding controller 105 so that the input signal is encoded in INTRA format. The input signal is DCT transformed and quantised. This is done on a macroblock by macroblock basis. The resulting signal is then locally decoded by inverse quantiser 108 and inverse DCT 109. Since the frame is INTRA coded, switch 113 is open. The output of adder 110 is input to the first picture store 107*a*. For this purpose switch 114*a* is closed whereas switches 114*b-g* are open. Thus frame store 107*a* holds a decoded version of reference picture I0.

The next picture to be encoded is frame 3, which is to be forwardly predicted from I0. Therefore, when frame 3 is input at 101, switch 102 is changed to INTER coding mode, the output switch 115 of the most recent reference picture store (i.e. switch 115*a*) is closed and the motion compensated contents of picture store 107*a* are subtracted from the input signal, motion compensation data having been calculated in a conventional manner. The prediction error data thus formed is then encoded by DCT transformer 103 and quantiser 104 and further locally decoded by inverse quantiser 108 and IDCT 109. Switch 113 is then closed, switch 115*a* closed and switch 114*b* closed (the other switches 114 and 115 being open). Thus, adder 110 adds the locally decoded prediction error data to the motion compensated prediction reference picture stored in picture store 107*a* and the result is stored in picture store 107*b*.

The next frame to be encoded is frame 2, which is to be coded as a B-frame. In order for this to occur, the contents of both of the frame stores 107*a* and 107*b* are made available to the subtractor 106 in a conventional manner. Since B-frames do not form a reference picture for any other frame, the encoded B-frame is not decoded and stored in a reference picture store.

Thus, in the case described above, after 19 frames, the frame stores 107*a* to 107*g* contain decoded versions of frames I0, P3, P6, P9, P12, P15 and P18 respectively.

According to the invention, when the encoder encodes a frame in a predictive manner, the encoding control manager 105 may associate with the frame a Spare Reference Picture Number (SRPN). For example, a SRPN may be associated with the P and B frames of a video signal but not with the I-frames.

Encoders can use this message to instruct decoders which reference picture or pictures resemble the current reference picture, so that one of them can be used as a spare reference picture if the actual reference picture is lost during transmission.

For example, in the encoding procedure described above, when frame 3 is encoded with reference to frame 0, no other reference frames are stored in the reference picture stores 107*a-g*. Therefore no SRPN is associated with frame 3. Similarly when frames 1 and 2 are bi-directionally encoded with reference to frames 0 and 3, there are no frames other than I0 and P3 held in the reference picture stores 107*a-g*. Therefore no SRPN can be associated with either of these frames.

However, when frame 6 is forwardly predicted from frame 3 (the decoded version of which is stored in picture store 107*b*) there is also a decoded copy of frame I0 in picture store 107*a*. The encoder calculates the similarity between the default reference picture of the current frame (i.e. frame 3 for frame 6) and the contents of the other populated picture stores i.e. picture store 107*a*. If two reference pictures are sufficiently similar (e.g. the correlation between the contents of frame store 107*a* and 107*b* is above a threshold), the encoder associates a SRPN with the data for frame 6. The SRPN identifies frame 0 as a spare reference picture. However, if the similarity is not sufficient, no SRPN is associated with frame 6.

The way in which the measure of similarity is generated is not material to the invention and any suitable measure of similarity may be used. For instance, a Sum of Absolute Differences (SAD) may be used as a measure of similarity. Preferably, an SAD value is calculated by taking the difference in value between spatially corresponding pixels in the default reference picture for the current frame and another "potential" reference frame i.e. a frame stored in one of the picture stores 107. The absolute value of each difference is obtained and the absolute difference values are accumulated to form the SAD. In this way, the SAD is representative of the similarity between the default reference frame and the other potential reference frame. Clearly two pictures can be deemed sufficiently similar when the SAD between them is below a threshold. Alternatively, the similarity of the default reference frame and another potential reference frame for the current picture can be assessed using picture histograms. A picture histogram is a measure of the number of occurrences of pixel values within a given image and two pictures can be deemed similar if their histograms correspond to a significant degree.

In an alternative embodiment of the invention, instead of determining the similarity between the default reference frame for the current frame and another potential reference frame, the encoder examines the similarity between another potential reference frame available in one of the picture stores 107 and the current frame itself. In this alternative embodiment of the invention a threshold is set defining the maximum difference allowable between the current frame and the potential reference frame. Thus any stored frame that exhibits a sufficiently high similarity (small difference) with the current frame can be used as a spare reference picture for the current picture. Again a Sum of Absolute Differences (SAD), image histogram, or any other appropriate method can be used to assess the degree of similarity or difference between the current frame and the other potential reference frame(s).

As will be appreciated, when frame 15 is to be encoded (as a P-frame), decoded versions of frames 0, 3, 6, 9 and 12 are held in picture stores 114*a-e* respectively. By default, frame 15 is encoded with reference to frame 12 as stored in picture store 107*e*. The encoder also carries out a calculation of the similarity between the data in picture store 107*e* (frame 12) and the data stored in the other populated picture stores 107*a-d*. The encoder identifies the picture store (and hence the reference picture) that has the closest similarity with the contents of picture store 107*e* i.e. with the default reference picture for the current frame being coded. The encoder then adds a SRPN to the encoded data that indicates the identified reference picture. This SRPN can be equal to the Temporal Reference of the reference picture as will be described below.

More than one SRPN may be associated with a frame. In this case, the SRPNs are ordered according to their similarity with the default reference picture, the most similar reference picture (other than the default) being mentioned first.

The encoding control manager 105 outputs the SRPN codeword on output 112*f* which indicates the Spare Reference Picture Number associated with the encoded frame. This is multiplexed into the video bit-stream.

FIG. 4 illustrates the operation of a first embodiment of the encoder. The first line of FIG. 4 represents the frames of data received from a capture input device and input to the video coder on input 101. The second line of FIG. 4 represents those frames of the input signal that the encoder decides to encode and the coding mode used to encode each frame. As mentioned above, in this example the encoder is arranged to encode every frame and to use the IBBP coding format.

Frame 0 is coded in INTRA-mode; frame 1 is encoded as a B-frame with reference to frame 0 and/or 3; frame 2 is encoded as a B-frame with reference to frame 0 and/or 3; frame 3 is encoded as a P-frame with reference to frame 0; frame 4 is encoded as a B-frame with reference to frame 3 and/or 6; frame 5 is encoded as a B-frame with reference to frame 3 and/or 6; frame 6 is encoded as a P-frame with reference to frame 3; etc.

The third line of FIG. 4 shows a SRPN field associated with frames of the encoded signal. In this embodiment, a SRPN is associated with the P-frames and B-frames, as shown in the third line of FIG. 4. The P-frames and B-frames of the encoded frames are temporally predictively encoded and the I-frames are not.

The fourth line of FIG. 4 shows the Temporal Reference (TR) of the encoded frame. This is a data field included in H.263 and the value of TR for a given frame is formed by incrementing the TR value of the temporally previous reference picture by one plus the number of skipped or non-reference pictures since the previously transmitted reference picture. Thus, in the example shown in FIG. 4 the TR shown for each frame is the same as the original temporal order of the frames in the original signal input to 101.

Examples of possible SRPN values are shown. These values indicate the TR of the spare reference frame, identified by the encoder as described above. Although this example shows only one SRPN for each predictively encoded picture, more than one SRPN may be associated with each predictively encoded picture, as described earlier.

FIG. 5 illustrates the operation of a second embodiment of an encoder according to the invention. In this embodiment, the encoder is arranged to code the frames according to the regular sequence I B B P B B P B B P B B I B B P B B P. However, in this embodiment, an SRPN is associated with forwardly predicted frames (i.e. P-frames) only.

The first line of FIG. 5 shows the input frames and the second line shows the coded frames and their coding mode, I, P or B.

The third line of FIG. 5 shows the SRPN values associated with P-frames. These may be generated as discussed above with reference to FIG. 3a.

The fourth line of FIG. 5 shows the Temporal Reference (TR) of the encoded frame. As in the example shown in FIG. 4, the TR shown for each frame is the same as the original temporal order of the frames in the original signal input to 101.

Considering the terminal 1 as receiving coded video data from terminal 2, the operation of the video codec 10 will now be described with reference to its decoding role. The terminal 1 receives a multimedia signal from the transmitting terminal 2. The demultiplexer 50 demultiplexes the multimedia signal and passes the video data to the video codec 10 and the control data to the control manager 40. The decoder 200 of the video codec decodes the encoded video data by inverse quantising, inverse DCT transforming and motion compensating the data. The controller 124 of the decoder checks the integrity of the received data and, if an error is detected, attempts to conceal the error in a manner to be described below. The decoded, corrected and concealed video data is then stored in one of the picture stores 123 and output for reproduction on a display 70 of the receiving terminal 1.

Considering first the signal as shown in FIG. 4, when a decoder according to the invention receives this signal, each frame of the signal is decoded in a conventional manner and then displayed on a display means. A decoded frame may be error corrected and error concealed in a conventional manner. Each time a frame is decoded, the decoder examines the TR value associated with the frame in order to determine when the frame is to be displayed.

In the case shown in FIG. 4, the decoder receives frame 0 and determines that the frame is INTRA-coded. The decoder decodes frame 0 without reference to any other picture and stores it in picture store 123a. The decoder then receives frame 3 and determines that the frame is INTER-coded as a P-frame. The decoder therefore decodes frame 3 with reference to the preceding reference frame 0 and stores it in the next picture store 123b. The decoder then decodes frames 1 and 2 with reference to frames 0 and 3 and so on. These frames are not stored in the picture stores 123 since, as B-pictures, they are not used as a reference frame for any other frame.

Let us now assume that the decoder is unable to decode (and thus reconstruct) frame 9, because the data for frame 9 is greatly corrupted or lost altogether and the next frame correctly received by the decoder is frame 7, with TR=7, and SRPN=0. As frame 9 (the default reference pictures for backward prediction of frame 7) was not decoded by the decoder, the decoder determines if there is an SRPN associated with frame 7, indicating an alternative frame that could be used for backward prediction. However, frame 7 does not include an SRPN in the backward direction. Therefore the decoder is unable to decode frame 7. This is also the case for frame 8.

The next frame to be received is frame 12, which was encoded with reference to picture 9 and has SRPN=6. Since frame 9 was not decoded, the decoder uses the reference picture indicated by the SRPN (i.e. frame 6 stored in picture store 123c) to decode frame 12. The decoder then receives frame 10, which was encoded with reference to frames 9 and 12. Frame 9 was not decoded by the decoder. However frame 10 has SRPN=6. Therefore the decoder uses the decoded reference frame 6, stored in picture store 123c, to decode frame 10 in the forward direction, rather than frame 9. This is also true for frame 11.

The decoder may detect the loss of a reference frame in a number of ways. For instance, information relating to the temporal order of each encoded frame may be examined. Alternatively, the reference frames of an encoded signal may be allocated a number in a sequential order as described in a British patent application filed by the Applicant on even date.

If the decoder has the facility to send control feedback data to the transmitting video encoder the decoder can send a request to the transmitting video encoder to encode a frame as an INTRA-frame and so stop the temporal error propagation that would result from frames 10 and 11 being decoded with reference to frame 6. The decoder continues to decode the signal in a conventional manner.

When the decoder receives frame 21, which is an INTRA frame, the decoder decodes frame 21 without reference to any other frame and stores the decoded frame in picture store 123. The decoder then decodes frames 19 and 20 with reference to frames 18 and 21. Even though some error may have been introduced to frame 18 by decoding frame 12 with reference to frame 6 rather than frame 9, the resulting image should be acceptable and the displayed picture is not held frozen until an INTRA picture is received. This may be more acceptable to a viewer.

Considering now the signal as shown in FIG. 5, when a decoder according to the invention receives this signal, each frame of the signal is decoded in a conventional manner and then displayed on a display means. The decoded frame may be error corrected and error concealed in a conventional manner. Each time a frame is decoded, the decoder examines the TR associated with the frame in order to determine when the frame is to be displayed.

The decoder receives frame 0, which is an INTRA frame, decodes it accordingly and stores it in picture store 123a. Let us now assume that the decoder is unable to reconstruct frame 3 because the data for the frame is greatly corrupted or lost altogether and the next frame correctly received and decoded by the decoder is frame 1. Frame 1 is a bi-directional frame encoded with reference to frame 0 and 3. Since frame 3 is lost, the decoder is unable to reconstruct frame 1 and similarly frame 2. The fact that B-frames 1 and 2 have been lost is of no consequence to the decoder as B-frames are not used as reference pictures for any other frames and thus their loss does not introduce any temporal error propagation. The decoder continues to decode the signal in a conventional manner.

The next frame received and decoded by the decoder is frame 6. The decoder knows that the preceding reference picture P3 has been lost (because it could not decode frame 1 or 2). The decoder therefore examines whether an SRPN is associated with frame 6. The decoder determines that frame 6 has a SRPN=0 and so uses frame 0 in the picture store 123a to decode frame 6.

If the decoder has the facility to send control feedback data to the transmitting video encoder, it can send a request to the transmitting video encoder to encode a frame as an INTRA-frame and so stop the temporal error propagation that would result from subsequent frames being decoded with reference to frame 6 which was decoded with reference to frame 0 rather than the default frame 3. However the decoder can continue decoding and does not freeze the picture on the display whilst it waits for an INTRA-coded frame.

How the spare reference picture number may be included in the encoded signal will now be addressed with reference to the H.263 video coding standard.

In H.263, the video bit-stream hierarchy has four layers: picture, picture segment, macroblock, and block layer. The picture layer data contain parameters affecting the whole picture area and the decoding of the picture data and in the H.263 video coding standard most of this data is arranged in a so-called picture header.

According to H.263, the picture segment layer can either be a group of blocks layer or a slice layer. By default, each picture is divided into groups of blocks. A group of blocks (GOB) typically comprises 16 successive pixel lines. Data for each GOB consists of an optional GOB header followed by data for macroblocks. If the optional slice structured mode is used, each picture is divided into slices instead of GOBs. A slice contains a number of successive macroblocks in scan-order. Data for each slice consists of a slice header followed by data for the macroblocks.

Each GOB or slice is divided into macroblocks. A macroblock relates to 16×16 pixels (or 2×2 blocks) of luminance data and the spatially corresponding 8×8 pixel blocks for each of the two chrominance components. A block comprises 8×8 pixels of luminance or chrominance data (pixel values or prediction error data).

Block layer data consist of uniformly quantised discrete cosine transform coefficients, which are scanned in zigzag order, processed with a run-length encoder and coded with variable length codes.

FIG. 6 shows the syntax of a bit stream as known according to H.263. The following implementations describe the GOB format but it will be clear to a skilled person that the invention may also be implemented in the slice format.

As mentioned already, the H.263 bit stream has four layers: the picture layer, picture segment layer, macroblock layer and block layer. The picture layer comprises a picture header followed by data for the Group of Blocks, eventually followed by any optional end-of-sequence code and stuffing bits.

The prior art H.263 bit stream is formatted as shown in FIG. 6. A descriptor for each part is given below:

PTYPE indicates use of a so-called PB frame mode (unless the PLUSTYPE filed is present and the used of DBQUANT is indicated therein). These issues are addressed in more detail in the H.263 specification.

The following paragraphs outline possible implementations of the bit-stream output by an encoder according to the first aspect of the invention and implemented in such a manner as to be compatible with H.263.

The spare reference picture number may be incorporated into an H.263 bit stream by modifying the H.263 picture header to include an additional codeword, SRPN, as shown in FIG. 7. The SRPN codeword indicates the Spare Reference Picture Number associated with the picture in question.

Alternatively, the SRPN may be included in the Supplemental Enhancement Information PSUPP (see Annex L of H.263 and FIG. 4). The supplemental information may be present in the H.263 bit stream even though the decoder may not be capable of providing the enhanced capability to use it, or even to properly interpret it. Simply discarding the supplemental information is allowable by decoders unless a requirement to provide the requested capability has been negotiated by external means.

If PEI is set to "1", then 9 bits follow consisting of 8 bits of data (PSUPP) and then another PEI bit to indicate if a further 9 bits follow and so on.

The PSUPP data consists of a 4-bit function type indication FTYPE, followed by a 4-bit parameter data size specification DSIZE followed by DSIZE octets of function parameter data, optionally followed by another FTYPE and so on. It is known to use this PSUPP codeword to signal various situations such as: to indicate a full-picture or partial-picture freeze or freeze-release request with or without resizing; to tag particular pictures or sequences of pictures within the video stream for external use; or to convey chroma key information for video compositing.

To implement the invention using the Supplemental Enhancement Information field of H.263, a further FTYPE is defined as Spare Reference Picture Number.

Figure 8:
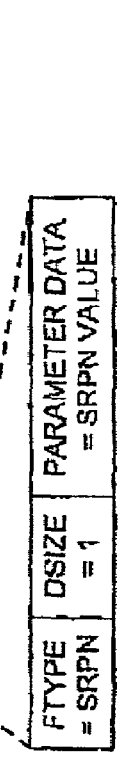
FIG. 8 shows a second example of a bit stream output by an encoder according to the invention.

FIG. 8 illustrates the example where a parameter SRPN is included in the SEI of the picture header. The FTYPE is

| | |
|---|---|
| PSC | The picture start code (PSC) indicates the start of the picture. |
| TR | The Temporal Reference (TR) is formed by incrementing its value in the temporally previous reference picture header by one plus the number of skipped or non-referenced pictures since the previously transmitted one. |
| PTYPE | Amongst other things, PTYPE includes details of the picture coding type i.e. INTRA or INTER. |
| PQUANT | A codeword that indicates the quantiser to be used for the picture until updated by any subsequent quantiser information. |
| CPM | A codeword that signals the use of optional continuous presence multipoint and video multiplex (CPM) mode. |
| PSBI | Picture Sub-Bit stream Indicator—only present if CPM is set. |
| $TR_B$ | Present if the frame is a bi-directionally predicted frame (known as a PB-frame). |
| DBQUANT | Present if a bi-directional frame. |
| PEI | This relates to extra insertion information and is set to "1" to indicate the presence of the following optional data fields PSUPP and PEI. PSUPP and PEI are together known as Supplemental Enhancement Information, which is further defined in Annex L of H263. |
| GOBS | Is the data for the group of blocks for the current picture. |
| ESTF | A stuffing codeword provided to attain byte alignment before EOS. |
| EOS | A codeword indicating the end of the data sequence for the picture. |
| PSTUF | A stuffing codeword to allow for byte alignment of the next picture start code PSC. |

The structure as shown in FIG. 6 does not include the optional PLUSTYPE data field. PSBI is only present if indicated by CPM. $TR_B$ and DBQUANT are only present if defined as SRPN. The DSIZE specifies the size of the parameter and the following octet is the parameter data i.e. the value of SRPN. From this value a receiving decoder can determine whether a spare reference picture is defined, which may be used if the main reference picture has been lost or corrupted.

Alternatively, the information may be contained in the additional Supplemental Enhancement Information as specified in a "Draft of new Annex W: Additional Supplementary Enhancement Information Specification" P. Ning and S. Wenger, ITU-T Study Group 16 Question 15 Document Q15-I-58, November 1999.

Figure 9:
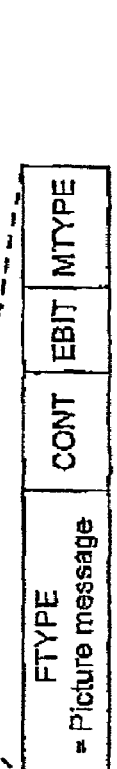
FIG. 9 shows a third example of a bit stream output by an encoder according to the invention.

In this draft proposal for Annex W, FTYPE 14 is defined as "Picture Message". When this FTYPE is set, the picture message function indicates the presence of one or more octets representing message data. The first octet of the message data is a message header with the structure shown in FIG. 9 i.e. CONT, EBIT and MTYPE. DSIZE is equal to the number of octets in the message data corresponding to a picture message function, including the first octet message header.

The continuation field CONT, if equal to 1, indicates that the message data associated with the picture message is part of the same logical message as the message data associated with the next picture message function. The End Bit Position field EBIT specifies the number of least significant bits that shall be ignored in the last message octet. Further details of these fields can be found in H.263 Annex W.

The field MTYPE indicates the type of message. Various types of message are suggested in the draft of H.263 Annex W. According to the invention one type e.g. MTYPE 13 is defined as Spare Reference Pictures. The value of MTYPE 13 is defined in the octet following the message header. The message data bytes contain the Picture Numbers of the spare reference pictures in preference order (the most preferred appearing first). Picture Numbers refer to the values that are transmitted according to Annex U or Annex W section W.6.3.12. The message format according to Annex W can be used for P, B, PB, Improved PB, and EP picture types. However, if Annex N or Annex U is in use and if the picture is associated with multiple reference pictures, the message format according to Annex W preferably shall not be used. For EP pictures, the message preferably shall be used only for forward prediction, whereas upward prediction may always be done from the temporally corresponding reference layer picture. For B, PB, and Improved PB picture types, the message specifies a picture for use as a forward motion prediction reference. This message shall not be used if the picture is an I or EI picture.

In a specific example where one spare reference picture is indicated and the SRPN is represented with 10 bits, this message contains one data byte, i.e., DSIZE is 3, CONT is 0, and EBIT is 6. It should be appreciated that the values of DSIZE, CONT and EBIT will vary according to the number of spare reference pictures indicated and the precision (number of bits) with which the spare reference picture numbers are represented. If more than one spare reference picture number is indicated, then preferably the message data bytes contain the Spare Reference Picture Number(s) of the spare reference pictures in preference order (the most preferred appearing first).

The above description has made reference to encoded video streams in which bi-directionally predicted pictures (B-pictures) are encoded. As mentioned earlier, B-pictures are never used as reference pictures. Since they can be discarded without impacting the picture quality of future pictures, they provide temporal scalability. Scalability allows for the decoding of a compressed video sequence at more than one quality level. In other words, a scalable multimedia clip can be compressed so that it can be streamed over channels with different data rates and still be decoded and played back in real-time.

Thus the video stream may be decoded in different ways by differing decoders. For instance, a decoder can decide only to decode the I- and P-pictures of a signal, if this is the maximum rate of decoding that the decoder can attain. However if a decoder has the capacity, it can also decode the B-pictures and hence increase the picture display rate. Thus the perceived picture quality of the displayed picture will be enhanced over a decoder that only decodes the I- and P-pictures.

Scalable multimedia is typically ordered so that there are hierarchical layers of data. A base layer contains a basic representation of the multimedia clip whereas enhancement layers contain refinement data on top of underlying layers. Consequently, the enhancement layers improve the quality of the clip.

Scalability is a desirable property for heterogeneous and error prone environments. This property is desirable in order to counter limitations such as constraints on bit rate, display resolution, network throughput, and decoder complexity.

Scalability can be used to improve error resilience in a transport system where layered coding is combined with transport prioritisation. The term transport prioritisation here refers to various mechanisms to provide different qualities of service in transport, including unequal error protection, to provide different channels having different error/loss rates. Depending on their nature, data are assigned differently. For example, the base layer may be delivered through a channel with a high degree of error protection, and the enhancement layers may be transmitted through more error-prone channels.

Generally, scalable multimedia coding suffers from a worse compression efficiency than non-scalable coding. In other words, a multimedia clip encoded as a scalable multimedia clip with enhancement layers requires greater bandwidth than if it had been coded as a non-scalable single-layer clip with equal quality. However, exceptions to this general rule exist, for example the temporally scalable B-frames in video compression.

The invention may be applied to scalable video compression systems. For instance, in H.263 Annex O, two forms of scalability are defined: signal-to-noise (SNR) scalability and spatial scalability.

Figure 10:
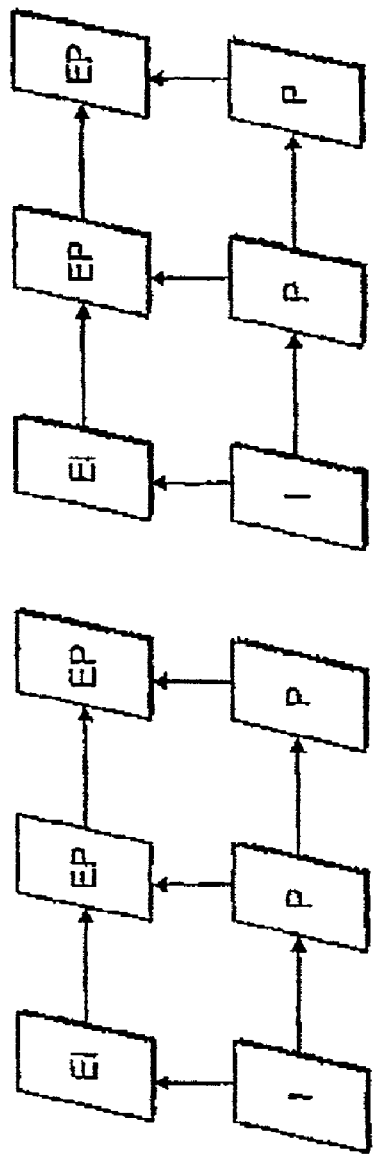
FIG. 10 illustrates enhancement layers used in video coding for SNR scalability.

Spatial scalability and SNR scalability are closely related, the only difference being the increased spatial resolution provided by spatial scalability. An example of SNR scalable pictures is shown in FIG. 10. SNR scalability implies the creation of multi-rate bit streams. It allows for the recovery of coding errors, or differences between an original picture and its reconstruction. This is achieved by using a finer quantiser to encode the difference picture in an enhancement layer. This additional information increases the SNR of the overall reproduced picture.

Figure 11:
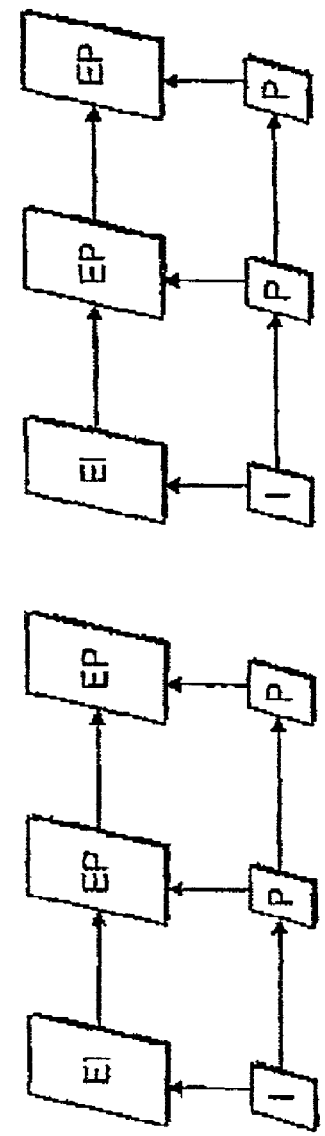
FIG. 11 illustrates enhancement layers used in video coding for spatial scalability.

Spatial scalability allows for the creation of multi-resolution bit streams to meet varying display requirements and/or constraints. A spatially scalable structure is illustrated in FIG. 11. It is essentially the same as in SNR scalability except that a spatial enhancement layer attempts to recover the coding loss between an up-sampled version of the reconstructed reference layer picture and a higher resolution version of the original picture. For example, if the reference layer has a quarter common intermediate format (QCIF) resolution, and the enhancement layer has a common intermediate format (CIF) resolution, the reference layer picture must be scaled accordingly such that the enhancement layer picture can be predicted from it. The QCIF standard allows the resolution to be increased by a factor of two in the vertical direction only, horizontal direction only, or both the vertical and horizontal directions for a single enhancement layer. There can be multiple enhancement layers, each increasing the picture resolution over that of the previous layer. The interpolation filters used to up-sample the reference layer picture are explicitly defined in the H.263 standard. Aside from the up-sampling process from the reference to the enhancement layer, the processing and syntax of a spatially scaled picture are identical to those of an SNR scaled picture.

In either SNR or spatial scalability, the enhancement layer pictures are referred to as EI- or EP-pictures. If the enhancement layer picture is upwardly predicted from a picture in the reference layer, then the enhancement layer picture is referred to as an Enhancement-I (EI) picture. In this type of scalability, the reference layer means the layer "below" the current enhancement layer. In some cases, when reference layer pictures are poorly predicted, over-coding of static parts of the picture can occur in the enhancement layer, causing an unnecessarily excessive bit rate. To avoid this problem, forward prediction is permitted in the enhancement layer. A picture that can be predicted in the forward direction from a previous enhancement layer picture or, alternatively, upwardly predicted from the reference layer picture is referred to as an Enhancement-P (EP) picture. Note that computing the average of the upwardly and forwardly predicted pictures can provide bi-directional prediction for EP-pictures. For both EI- and EP-pictures, upward prediction from the reference layer picture implies that no motion vectors are required. In the case of forward prediction for EP-pictures, motion vectors are required.

The SRPN field can be associated with P, PB, Improved PB, and Enhancement Layer (EP) pictures. The characteristics of PB and Improved PB frames are described in H.263 Annex G and Annex M respectively.

However, if Annex N or Annex U of H.263 is in use and if the picture is associated with multiple reference pictures, an SRPN is not provided. For PB and Improved PB pictures, an SRPN is typically associated with only the P-part. For EP pictures, the SRPN is provided for use in forward prediction, whereas upward prediction is performed using the temporally corresponding reference layer picture. An SRPN is preferably not provided if the picture is an I, EI or B picture.

If the encoder is capable of multi-layer coding (for example, as discussed in Annex O of H.263) each layer has consecutive Spare Reference Picture Numbers. These may be associated with the enhancement layer number (ELNUM) of the current picture. The Spare Reference Picture Number is incremented by one from the corresponding number of the previous coded reference picture in the same enhancement layer. However, if adjacent pictures in the same enhancement layer have the same temporal reference, and if Annex N or Annex U of H.263 is in use, the decoder preferably regards this as an indication that redundant copies have been sent of approximately the same pictured scene content, and all of these pictures then share the same Picture Number.

It should also be noted that according to an embodiment of the invention, it is possible to indicate an SRPN for a specified rectangular area of the current picture. There may be multiple messages for one picture each specifying SRPNs for non-overlapping rectangular areas of the current picture. If the messages do not specify an SRPN for some areas of the picture, a decoder can use error concealment to conceal errors in those areas if the corresponding reference frame (or area thereof) from which they are predicted cannot be decoded. In this situation, the decoder preferably uses a concealment method that corresponds to the picture type i.e. for an INTRA picture an INTRA error concealment method is used and for an INTER picture an INTER error concealment method is used.

A specific example of the above situation, in which SRPN values are provided for different areas of a current picture, will now be given. Each SRPN message, comprises an SRPN and four PSUPP octets containing the horizontal and vertical location of the upper left corner of the specified rectangular area of the picture, and the width and height of the rectangular area, respectively, using eight bits each and expressed in units of 16 pixels (of luminance picture). For example, using this convention, an entire QCIF picture is specified by the four parameters (0, 0, 11, 9).

For picture formats having a width and height that is not divisible by 16, the specified area may extend to the next larger size that would be divisible by 16. For example, an entire image having size of 160×120 pixels is specified by the four parameters (0, 0, 10, 8). Preferably, the specified area does not cross picture boundaries nor overlap with other specified error concealment areas of the same picture.

The invention may be implemented in other video coding protocols. For example MPEG-4 defines so-called user data, which can contain any binary data and is not necessarily associated with a picture. The additional field may be added to these fields.

An alternative embodiment of the invention, specifically designed for compatibility with the H.26L video coding recommendation currently under development by the Joint Video Team of ISO/IEC and ITU-T VCEG will now be described. The provisions of H.26L differ from those of H.263 in certain respects that impact on the implementation of the current invention. In particular, H.26L uses a bit-stream hierarchy that is different in key respects from that used in H.263. Thus, the way in which spare reference pictures according to the invention are identified in an H.26L compatible implementation is different from that used in the H.263 bit-stream described above.

According to H.26L each reference picture in a video sequence is identified by a picture number, but individual picture headers are not used. Furthermore, and unlike the situation in H.263, H.26L allows any given frame to be associated with more than one reference picture. This means, in effect, that there is no single particular default reference frame for a picture to be coded and any frame may potentially be used as the reference for any other. Therefore, it is important to identify spare reference pictures in a reliable manner.

The picture number defined according to H.26L is used as an identifier for pictures stored on a short-term basis in the encoder or decoder buffer. The picture number is incremented by 1 for each picture stored. When a certain maximum picture number, defined in the parameter set, is reached, the picture number wraps over to zero. Thus, in H.26L, picture numbers are used only as short-term identifiers. Nevertheless, a decoder can identify the loss of a picture by examining the difference in picture number between two consecutively received pictures. More specifically, if the difference between the picture numbers of two consecutively received and stored pictures is not 1, the decoder can infer a picture loss or corruption of data.

As in H.263, according to H.26L, the pictures of a video sequence are arranged into groups of pictures (GOPs). However, the GOP concept used in H.26L is rather more sophisticated than that specified in H.263. More specifically, JVT document JVT-B042 introduced an enhanced GOP concept that organises pictures in so-called "scalability layers" and "sub-sequences". A sub-sequence represents a number of inter-dependent pictures that can be discarded without affecting the decoding of any sub-sequence in a less enhanced scalability layer. The layer and sub-sequence to which a given picture belongs is signalled in the slice headers of the picture in question. Consequently, pictures having the same picture number, but residing in different layers or sub-sequences can be distinguished from each other.

Thus, according to a first embodiment of the invention tailored for compatibility with the H.26L video coding recommendation, picture numbers are used to identify the spare reference picture or pictures for a frame being coded. In an alternative embodiment, layer numbers or sub-sequence identifiers are used. This alternative allows spare reference pictures having identical picture numbers but residing in different layers or sub-sequences to be identified reliably. As in the previously described embodiments relating to H.263, information identifying the spare reference picture(s) for a given frame is provided using the Supplemental Enhancement Information (SEI) mechanism.

Commonly, part of a scene being filmed, for example the background in a video sequence filmed with a static camera, changes little (if at all) from one frame to the next. Thus, the background in any one of a number of consecutive frames could be used for prediction of a subsequent frame in the sequence. Therefore, according to a further embodiment of the invention compatible with the H.26L video coding recommendation, the provision of spare reference pictures is extended to regions of pictures. As described in greater detail below, according to this embodiment of the invention, the indication of a spare reference picture provided in the SEI message may specify whether a complete picture or part of a picture is to be used as a spare reference for the prediction of image content in a frame to be coded. An example of the proposed SEI message syntax according to this embodiment of the invention is presented in Table 1 below. Further details of the notation used in Table 1 can be found from JVT Working Draft 2, Document JVT-B 118r7.

In the example SEI syntax presented above in Table 1, the parameter ref_area_indicator can take one of the following values:

0: The message concerns the entire picture area.
1: The message concerns the entire picture area excluding the rectangle specified by the following parameters.
2: The message concerns the rectangle specified by the following parameters.

The parameters ref_area_topleft and ref_area_bottomright specify the corners of the rectangle referred to in the semantics of ref_area_indicator. The unit in which the ref_area_topleft and ref_area_bottomright parameters are specified is a macroblock. The macroblocks are numbered in raster scan-order starting from the top-left macroblock of the picture having number 0.

The parameter number of spare_reference_pictures_minus_2 specifies the number of pictures that are associated with each other as spare reference pictures or regions and the parameter ref_pic_identification mode can take one of the following values:

0: A negative difference with respect to the previous picture number (PN) is signalled in the SEI message.
1: A positive difference with respect to the previous picture number (PN) is signalled in the SEI message.
2: An absolute PN is signalled in the SEI message.

TABLE 1

H.26L SEI Message Syntax for Indication of Spare Reference Picture Number

| | Mnemonic |
|---|---|
| spare_reference_message ( ) { | |
|     parameter_set_id(picture_parameter_set) | |
|     ref_area_indicator | ecselbf |
|     if (ref_area_indicator > 0) { | |
|         ref_area_topleft | uimsbf(X) |
|         ref_area_bottomright | uimsbf(X) |
|     } | |
|     number_of_spare_reference_pictures_minus_2 | ecselbf |
|     for (loop_count = 0; | |
|     loop_count < number_of_spare_reference_pictures_minus_2 + 2; | |
|     loop_count++) { | |
|         if (loop_count > 0) | |
|             ref_pic_identification_mode | ecselbf |
|         else | |
|             ref_pic_identification_mode = 2 | |
|         if (ref_pic_identification_mode < 2) | |
|             delta_PN_magnitude | ecselbf |
|         if (ref_pic_identification_mode == 2) | |
|             ref_absolute_PN | uimsbf |
|         if (NOL > 0) { | |
|             ref_layer_number_plus_1 | ecselbf |
|             if (ref_layer_number_plus_1 > 0) | |
|                 ref_sub_sequence_identifier | ecselbf |
|         } | |
|     } | |
| } | |

The picture parameter set identifier indicates the picture and independent GOP parameter sets that are valid for the SEI message, in particular the picture size and maximum picture number parameters.

For the first picture of the SEI message, an absolute picture number is signalled. For later pictures in the SEI message, the picture number can be coded differentially (ref_pic_identification<2) as follows:

if (ref_pic_identification=0)
 ref_absolute_PN=ref_absolute_PN−delta_PN_magnitude
else
 ref_absolute_PN=ref_absolute_PN+delta_PN_magnitude The invention is not intended to be limited to the video coding protocols discussed above: these are intended to be merely exemplary. The invention is applicable to any video coding protocol using temporal prediction. The addition of the information as discussed above allows a receiving decoder to determine the best course of action if a picture is lost.

What is claimed is:

1. A method for encoding a video signal in an apparatus to form an encoded video signal, the video signal representing a sequence of pictures, the method comprising, as a result of operations performed in the apparatus:
   obtaining a local default reference picture by encoding and decoding a picture of the sequence;
   forming a motion compensated prediction for a current picture of the sequence or a part of a current picture using the local default reference picture;
   generating an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and
   providing the indicator for use in the corresponding decoding process to identify the alternative reference picture for use in error concealment.

2. A method according to claim 1, the method comprising, as a result of operations performed in the apparatus:
   forming a motion compensated prediction for at least part of the current picture from a first local default reference picture and a second local default reference picture, the first local default reference picture corresponding to a picture of the sequence occurring temporally before the current picture and the second local default reference picture corresponding to a picture of the sequence occurring temporally after the current picture;
   comparing the current picture with a further reference picture corresponding to a picture of the sequence occurring temporally before the current picture to calculate a measure of similarity between the two;
   comparing the measure of similarity against a pre-determined similarity criterion; and
   generating the indicator based on said comparison.

3. A method according to claim 1, the method comprising, as a result of operations performed in the apparatus:
   identifying more than one alternative reference picture for the current picture or respectively for said part of a current picture by comparing the current picture with a plurality of further reference pictures to calculate respective measures of similarity; and
   providing an indicator for each further reference picture that meets the predetermined similarity criterion to provide more than one indicator for the current picture or respectively for said part of a current picture.

4. A method according to claim 3, the method comprising, as a result of operations performed in the apparatus, ranking the further reference pictures based on said comparison and providing said more than one indicator for the current picture or respectively for said part of a current picture in a ranking order, the indicator associated with the further reference picture having the closest similarity to the current picture being placed first in the ranking order.

5. A method according to claim 1, the method comprising, as a result of operations performed in the apparatus, providing the indicator in a picture header of the encoded video signal.

6. A method according to claim 1, the method comprising, as a result of operations performed in the apparatus, providing the indicator in one of a picture segment header or a macroblock header of the encoded video signal when the indicator is associated with a part of a current picture.

7. A method according to claim 1, the method comprising, as a result of operations performed in the apparatus, encoding the sequence of pictures according to the H.263 video compression standard and providing the indicator in the Supplemental Enhancement Information in accordance with the H.263 video compression standard.

8. A method according to claim 1, the method comprising, as a result of operations performed in the apparatus, generating the indicator to indicate one of a temporal reference of the alternative reference picture or a picture number of the alternative reference picture.

9. A method according to claim 1, the method comprising, as a result of operations performed in the apparatus, providing respective indicators to indicate corresponding alternative reference pictures for B pictures and P pictures.

10. A method according to claim 1, the method comprising, as a result of operations performed in the apparatus, providing indicators to indicate alternative reference pictures for P pictures only.

11. A method according to claim 1, the method comprising, as a result of operations performed in the apparatus:
    identifying the alternative reference picture for the current picture or said part of a current picture by comparing the current picture with a further reference picture to calculate a measure of similarity between the two;
    comparing the measure of similarity against a pre-determined similarity criterion; and
    generating the indicator based on the comparison.

12. A method according to claim 11, the method comprising, as a result of operations performed in the apparatus, calculating the measure of similarity as a sum of absolute differences using differences in pixel values between the current picture and the further reference picture.

13. A method according to claim 11, the method comprising, as a result of operations performed in the apparatus, calculating the measure of similarity between the current picture and the further reference picture using picture histograms.

14. A method according to claim 1, the method comprising, as a result of operations performed in the apparatus, scalably encoding the video signal and providing respective indicators to indicate corresponding alternative reference pictures for predictively encoded enhancement layer pictures of the scalably encoded video signal.

15. An encoder for encoding a video signal to form an encoded video signal, the video signal representing a sequence of pictures, wherein the encoder is configured to:
    obtain a local default reference picture by encoding and decoding a picture of the sequence;
    form a motion compensated prediction for a current picture of the sequence or a part of a current picture using the local default reference picture;

generate an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and provide the indicator for use in the corresponding decoding process to identify the alternative reference picture for use in error concealment.

16. An encoder according to claim 15, wherein the encoder is configured to:

form a motion compensated prediction for at least part of a current picture from a first local default reference picture and a second local default reference picture, the first local default reference picture corresponding to a picture of the sequence occurring temporally before the current picture and the second local default reference picture corresponding to a picture of the sequence occurring temporally after the current picture;

compare the current picture with a further reference picture corresponding to a picture of the sequence occurring temporally before the current picture to calculate a measure of similarity between the two;

compare the measure of similarity against a predetermined similarity criterion; and generate the indicator based on said comparison.

17. An encoder according to claim 15, wherein the encoder is configured to:

identify more than one alternative reference picture for the current picture or respectively for said part of a current picture by comparing the current picture with a plurality of further reference pictures to calculate respective measures of similarity; and provide an indicator for each further reference picture that meets a predetermined similarity criterion to provide more than one indicator for the current picture or respectively for said part of a current picture.

18. An encoder according to claim 17, wherein the encoder is configured to rank the further reference pictures based on said comparison and to provide said more than one indicator for the current picture or respectively for said part of a current picture in a ranking order, the indicator associated with the further reference picture having the closest similarity to the current picture being placed first in the ranking order.

19. An encoder according to claim 15, wherein the encoder is configured to provide the indicator in a picture header of the encoded video signal.

20. An encoder according to claim 15, wherein the encoder is configured to provide the indicator in one of a picture segment header or a macroblock header of the encoded video signal when the indicator is associated with a part of the current picture.

21. An encoder according to claim 15, wherein the encoder is configured to encode the video signal according to the H.263 video compression standard and to provide the indicator in the Supplemental Enhancement Information in accordance with the H.263 video compression standard.

22. An encoder according to claim 15, wherein the encoder is configured to generate the indicator to indicate one of a temporal reference of the alternative reference picture or a picture number of the alternative reference picture.

23. An encoder according to claim 15, wherein the encoder is configured to provide respective indicators to indicate corresponding alternative reference pictures for B pictures and P pictures.

24. An encoder according to claim 15, wherein the encoder is configured to provide indicators to indicate alternative reference pictures for P pictures only.

25. An encoder according to claim 15, wherein the encoder is configured to:

identify the alternative reference picture for the current picture or said part of a current picture by comparing the current picture with a further reference picture to calculate a measure of similarity between the two;

compare the measure of similarity against a pre-determined similarity criterion; and generate the indicator based on said comparison.

26. An encoder according to claim 25, wherein the encoder is configured to calculate the measure of similarity as a sum of absolute differences using differences in pixel values between the current picture and the further reference picture.

27. An encoder according to claim 25, wherein the encoder is configured to calculate the measure of similarity between the current picture and the further reference picture using picture histograms.

28. An encoder according to claim 15, wherein the encoder is configured to encode the video signal as a scalable video sequence and to provide respective indicators to indicate corresponding alternative reference pictures for predictively encoded enhancement layer pictures of the scalable video sequence.

29. A radio telecommunications device comprising an encoder for encoding a video signal to form an encoded video signal, the video signal representing a sequence of pictures, wherein the encoder is configured to:

obtain a local default reference picture by encoding and decoding a picture of the sequence;

form a motion compensated prediction for a current picture of the sequence or a part of a current picture using the local default reference picture;

generate an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and provide the indicator for use in the corresponding decoding process to identify the alternative reference picture for use in error concealment.

30. A multimedia terminal device comprising an encoder for encoding a video signal to form an encoded video signal, the video signal representing a sequence of pictures, wherein the encoder is configured to:

obtain a local default reference picture by encoding and decoding a picture of the sequence;

form a motion compensated prediction for a current picture of the sequence or a part of a current picture using the local default reference picture;

generate an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and provide the indicator for use in the corresponding decoding process to identify the alternative reference picture for use in error concealment.

31. An apparatus for encoding a video signal to form an encoded video signal, the video signal representing a sequence of pictures, wherein the apparatus is configured to:

obtain a local default reference picture by encoding and decoding a picture of the sequence;

form a motion compensated prediction for a current picture of the sequence or a part of a current picture using the local default reference picture;

generate an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and provide the indicator for use in the corresponding decoding process to identify the alternative reference picture for use in error concealment.

32. An encoder for encoding a video signal to form an encoded video signal, the video signal representing a sequence of pictures, the encoder comprising:

a predictive encoder configured to obtain a local default reference picture by encoding and decoding a picture of the sequence and to form a motion compensated prediction for a current picture of the sequence or a part of a current picture using the local default reference picture;

a spare reference picture indicator generator configured to generate an indicator for use in error concealment of the current picture or respectively for said part of a current picture, the indicator configured to identify a spare reference picture, which is sufficiently similar to the local default reference picture, so that the spare reference picture can be used in a corresponding decoding process, instead of a corresponding default reference picture, for use in forming a motion compensated prediction for the current picture or respectively for said part of a current picture when the corresponding default reference picture cannot be reconstructed in the corresponding decoding process; and an output configured to provide the indicator for use in the corresponding decoding process to identify the spare reference picture for use in error concealment.

33. An encoder according to claim 32, wherein the spare reference picture indicator generator is configured to:

identify the spare reference picture for the current picture or said part of a current picture by comparing the local default reference picture with a further reference picture to calculate a measure of similarity between the two;

compare the measure of similarity against a pre-determined similarity criterion; and generate the indicator based on said comparison.

34. An encoder for encoding a video signal to form an encoded video signal, the video signal representing a sequence of pictures, the encoder comprising:

a predictive encoder configured to obtain a local default reference picture by encoding and decoding a picture of the sequence and to form a motion compensated prediction for a current picture of the sequence or a part of a current picture using the local default reference picture;

a spare reference picture indicator generator configured to generate an indicator for use in error concealment of the current picture or respectively for said part of a current picture, the indicator configured to identify a spare reference picture, which is sufficiently similar to the current picture, so that the spare reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and an output configured to provide the indicator for use in the corresponding decoding process to identify the spare reference picture for use in error concealment.

35. An encoder according to claim 34, wherein the spare reference picture indicator generator is configured to:

identify the spare reference picture for the current picture or said part of a current picture by comparing the current picture with a further reference picture to calculate a measure of similarity between the two;

compare the measure of similarity against a pre-determined similarity criterion; and generate the indicator based on said comparison.

36. A decoder for decoding an encoded video signal representing a sequence of pictures, the decoder comprising:

an input configured to receive encoded video data for a current picture of the sequence or a part of a current picture, the received video data having been encoded with respect to a default reference picture by forming a motion compensated prediction for the current picture or said part of a current picture using the default reference picture;

a controller configured to determine that the default reference picture cannot be reconstructed at the decoder;

a spare reference picture examiner configured to examine an indicator provided for use in error concealment of the current picture or respectively for said part of a current picture to identify a spare reference picture for use in forming an alternative motion compensated prediction for the current picture or respectively for said part of a current picture; and a predictive decoder configured to, in response to determining that the default reference picture cannot be reconstructed, decode the received encoded video data for the current picture or said part of a current picture with respect to the spare reference picture, instead of the default reference picture, by forming an alternative motion compensated prediction for the current picture or respectively for said part of a current picture using the spare reference picture, to provide for error concealment.

37. An encoder for encoding a video signal to form an encoded video signal representing a sequence of pictures, the encoder comprising:

means for obtaining a local default reference picture by encoding and decoding a picture of the sequence;

means for forming a motion compensated prediction for a current picture of the sequence or a part of a current picture using the local default reference picture;

means for generating an indicator for use in error concealment of the current picture or respectively for said part of a current picture, the indicator configured to identify an alternative reference picture, which is sufficiently similar to the current picture, so that the alternative reference picture can be used in a corresponding decoding process, instead of a corresponding default reference picture, in forming a motion compensated prediction for the current picture or respectively for said part of a current picture when the corresponding default reference picture cannot be reconstructed in the corresponding decoding process; and means for providing the indicator for use in the corresponding decoding process to identify the alternative reference picture for use in error concealment.

38. An encoder according to claim 37, comprising:

means for identifying the alternative reference picture for the current picture or said part of a current picture by comparing the current picture with a further reference picture to calculate a measure of similarity between the two;

means for comparing the measure of similarity against a pre-determined similarity criterion; and means for generating the indicator based on the comparison.

* * * * *